Dec. 7, 1943.   T. R. SCOTT ET AL   2,336,040
JOINT FOR ELECTRIC POWER CABLES
Original Filed Feb. 23, 1940
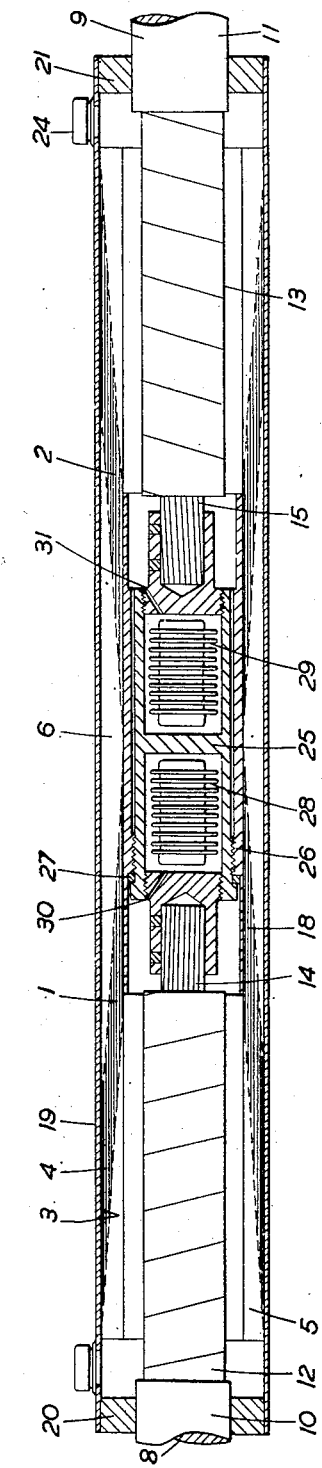
INVENTORS
T R Scott
J K Webb
BY
R P Morris
ATTORNEY Patented Dec. 7, 1943

2,336,040

UNITED STATES PATENT OFFICE 2,336,040

JOINT FOR ELECTRIC POWER CABLES

Thomas Robertson Scott and John Krauss Webb, London, England, assignors to International Standard Electric Corporation, New York, N. Y.

Original application February 23, 1940, Serial No. 320,378. Divided and this application May 16, 1942, Serial No. 443,252. In Great Britain March 24, 1939

5 Claims. (Cl. 174—22)

This invention relates to a joint for electric power cables and is divided from application Serial No. 320,378, filed February 23, 1940.

It is an object of the present invention to provide a joint for electric power cables that can be rapidly assembled.

The invention will be understood from the following description taken in conjunction with the accompanying drawing which shows a joint constructed according to the invention.

The drawing shows a joint made between two power cables 8, 9. The cables 8, 9 comprise respectively lead sheaths 10, 11, insulation 12, 13 and conductors 14, 15. In the preparation of the joint there is used a structure 5 which may be completely formed and tested in the factory, thereby reducing the jointing time required in the field. This structure 5 comprises two condenser cones 1, 2 and may be formed by winding conductive layers 3 and insulating layers 4 on a common former 18 in such a way that the two cones 3 and 4 are held together by inter-leaving layers of insulation forming an annulus 6 of insulation between the cones 1 and 2. The two cones 1, 2 and the additional insulation 6 are wound in one operation, for example, from a single roll of paper or other insulant, prior to application to the cable. The insulation is, therefore, preformed and may comprise a single compact cylinder formed upon a metal tube, the insulation 4 being provided with metallic conducting layers 3 to give the condenser cone effect.

The insulation 4, 6, may comprise paper impregnated with oil, paper impregnated with polymerised material (e. g., paper impregnated with polystyrene, hereinafter referred to as styrenated paper), or other suitable insulating material. If styrenated paper be used the styrenation may be effected by impregnating the condenser roll 5 comprising the two condenser cones 1, 2 with monomeric styrene and subsequently effecting polymerisation. Alternatively, pre-styrenated paper may be employed and adjacent layers welded together after winding by heating. This or a similar method may be employed if a sheet or film of styrene, styrene rubber, or a blend of styrene with other polymers such as polyisobutylene, is used for winding the roll. It may here be emphasised that should it be desired to construct a barrier or stop joint then polymerised material should be employed.

The preformed roll 5 is slid over the end of one cable length, the conductors 14, 15 are jointed by a ferrule, and the roll is then slid along until it is centrally over the ferrule.

The brass ferrule 25 is threaded externally at 26 to screw into a thread provided in the interior surface of the former 18 of the roll 5. The roll 5 when it is being slid back into position, after jointing of the conductors, will engage with the ferrule thread 26, and final adjustment may be effected by rotation of the roll 5 so that it is screwed along the thread 26. Preferably, final positioning of the roll 5 takes place when it engages a stop positioned to prevent further movement of the roll. This stop can take the form of a shoulder provided with an oil resisting rubber washer 27.

A metal joint sleeve 19 is then applied overall and plumbed to the lead sheaths 10, 11 of the cable lengths as shown at 20, 21. The interior of the sleeve 19 may then be evacuated and filled with an insulating compound (preferably plastic and non-migratory, e. g., polystyrene or the like) through the filling nozzle 24. The inner diameter of the sleeve 19 may be substantially equal to the outer diameter of the roll 5 and may be bonded thereto by means of styrene or the like. On the other hand when migratory compound is used, the sleeve 19 may be of greater internal diameter than that of the external diameter of the roll 5, which may also be eccentrically disposed within the sleeve 19 in such a manner that there is an excess of filling compound at the upper side of the joint, the outer surface of the roll 5 in such a case being preferably metallised and maintained at sleeve potential by means of a conductive spring contacting with the exterior of the roll and the interior of the sleeve 19.

In cases in which the sleeve 19 is of greater diameter internally than that of the roll 5 and barrier action is required, the space between the sleeve 19 and the roll 5 may be divided into two or more compartments by one or more radial discs (e. g., of metal or insulating material) which may be bonded to the sleeve 19 (e. g., by polystyrene) and the compartments may be filled with insulating material (e. g., polystyrene) or if the outer surface of the roll 5 is metallised may be filled with metal.

The ferrule 25 may be made hollow to accommodate expansible gas-filled bellows 28, 29 to compensate for the thermal expansion of the oil in the joint and to prevent the pressure of the oil from falling below some predetermined value. The ferrule 25 is in this case provided also with oil channels 30, 31.

It may be mentioned that while the invention has been described with special reference to a single core cable, a similar method may, with advantage, be applied to a multi-core cable.

What is claimed is:

1. A cable joint for joining two ends of a power cable comprising a metal ferrule for joining the cable core ends, said ferrule having a hollowed portion between the core ends, a sealed flexible bellows within the hollowed portion, an opening from said hollowed portion to the exterior of said ferrule, a sheath around the joint and a fluid cable filling compound around the ferrule within the sheath.

2. A ferrule for joining core ends of cables for use in fluid-filled joints, said ferrule comprising a sleeve portion at each end for receiving cable core ends, a generally cylindrical conductive body between the sleeve portions, said body having a substantially enclosed hollowed portion with an opening to the outside of said ferrule, and a sealed flexible bellows within the hollowed portion, whereby said ferrule may be handled as a unit and when installed in a fluid-filled joint abnormal pressures due to heat expansion may be substantially avoided.

3. A fluid-filled power cable joint comprising a metal ferrule for electrically connecting cable core ends, a graded condenser wound on a tubular metal form and telescoped over said ferrule, said form including on its inner surface an annular threaded portion, and a threaded portion on said ferrule for engagement with said first-mentioned threaded portion.

4. A cable joint according to claim 3, in which said ferrule is substantially hollow and defines a chamber between the core ends with an opening to the outside of said ferrule, and further comprises an expansible gas-filled bellows within said chamber.

5. A fluid-filled power cable joint according to claim 3, in which said ferrule is substantially hollow between the core ends and includes a generally centrally located transversely extending wall portion thereby defining two chambers between the core ends, said chambers each having an opening to the outside of said ferrule, the opening of one of said chambers being to one side of said second-mentioned threaded portion and the opening of the other of said chambers being to the other side of said second-mentioned threaded portion, and an expansible gas-filled bellows in each of said chambers, whereby said joint may serve as a fluid stop preventing migration of cable fluid and may also prevent generation of excessive physical stress due to heating.

THOMAS ROBERTSON SCOTT.
JOHN KRAUSS WEBB.